(12) United States Patent
Chatterjee et al.

(10) Patent No.: US 10,684,538 B2
(45) Date of Patent: Jun. 16, 2020

(54) MINIATURE LOGO PROJECTOR DESIGN FOR AUTOMOTIVE INTERIOR LIGHTING

(71) Applicants: Ron Chatterjee, Fort Wayne, IN (US); Jinwon Sung, Troy, MI (US)

(72) Inventors: Ron Chatterjee, Fort Wayne, IN (US); Jinwon Sung, Troy, MI (US)

(*) Notice: Subject to any disclaimer, the term of this patent is extended or adjusted under 35 U.S.C. 154(b) by 0 days.

(21) Appl. No.: 16/369,181

(22) Filed: Mar. 29, 2019

(65) Prior Publication Data

US 2020/0110330 A1  Apr. 9, 2020

Related U.S. Application Data

(60) Provisional application No. 62/742,084, filed on Oct. 5, 2018.

(51) Int. Cl.
*G03B 21/20* (2006.01)
*F21S 41/19* (2018.01)
*F21S 41/141* (2018.01)

(52) U.S. Cl.
CPC ........ *G03B 21/2033* (2013.01); *F21S 41/141* (2018.01); *F21S 41/19* (2018.01); *G03B 21/2046* (2013.01)

(58) Field of Classification Search
CPC . G03B 21/2033; G03B 21/2046; F21S 41/19; F21S 41/141
See application file for complete search history.

(56) References Cited

U.S. PATENT DOCUMENTS

| | | | |
|---|---|---|---|
| 2008/0012728 A1* | 1/2008 | Heym | B64D 11/0015 340/945 |
| 2012/0292986 A1* | 11/2012 | Riedel | B64D 11/00 307/9.1 |
| 2017/0210282 A1* | 7/2017 | Rodriguez Barros | G03B 21/00 |
| 2017/0289494 A1* | 10/2017 | Garing | H04N 9/3141 |
| 2019/0111847 A1* | 4/2019 | Messenger | B60R 1/08 |

FOREIGN PATENT DOCUMENTS

DE        102017207711 A1    11/2017

* cited by examiner

*Primary Examiner* — Mary Ellen Bowman
(74) *Attorney, Agent, or Firm* — Volpe and Koenig, P.C.

(57) ABSTRACT

A miniature optical design of an interior projection lighting system is suitable for automotive applications. The design provides an image, such as a logo, with suitable image quality on a desired vehicle surface. The design accounts for tilt between the projector and a target vehicle surface and includes minimal constituent parts, for example as few as two lenses, so as to minimize track length.

12 Claims, 16 Drawing Sheets

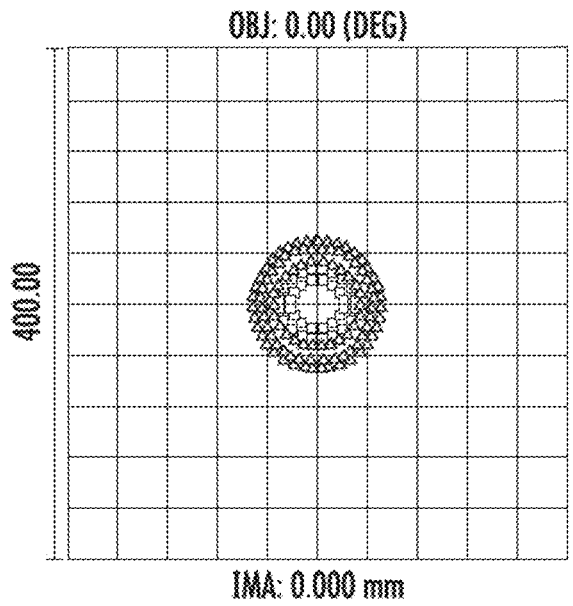
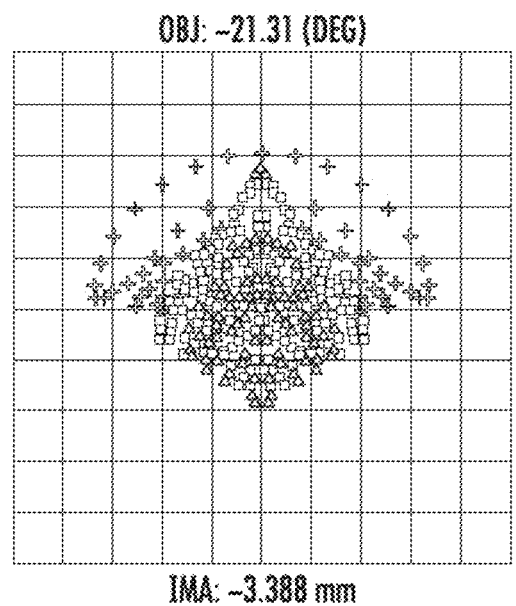
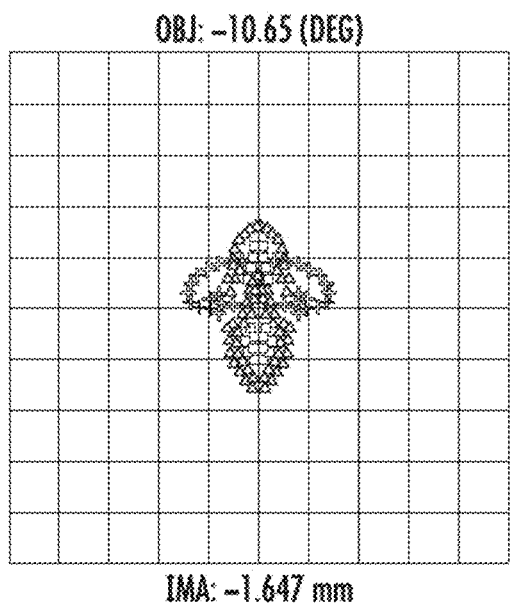
FIG. 9

| # | OBJECT TYPE | ON Y POSITION | Z POSITION | TILT ABOUT X | TILT ABOUT Y | TILT ABOUT Z | MATERIAL | # LAYOUT RAYS | # ANALYSIS RAYS | POWER (LUMENS) |
|---|---|---|---|---|---|---|---|---|---|---|
| 1 | SOURCE RECTANGLE | 0.000 | 4.000 | 0.000 | 0.000 | 0.000 | | 100 | 2E+07 | 100.000 |
| 2 | CYLINDER PIPE | 0.000 | 4.000 | 0.000 | 0.000 | 0.000 | | 5.200 | 8.500 | 5.200 |
| 3 | STANDARD LENS | 0.000 | 4.500 | 0.000 | 0.000 | 0.000 | PMMA | -0.000 | 0.000 | 5.100 |
| 4 | STANDARD LENS | 0.000 | 7.332 | 0.000 | 0.000 | 0.000 | PMMA | -0.000 | 0.000 | 5.100 |
| 5 | AMULLN | 0.000 | 4.067 | 0.000 | 0.000 | 0.000 | | 10.000 | 10.000 | 3.500 |
| 6 | CAD PART: STEP/IGE/SAT | 0.000 | 4.000 | 0.000 | 0.000 | 0.000 | | 1.000 | 3 | 5 |
| 7 | NULL OBJECT | 0.000 | 3.241 | 0.000 | 0.000 | 0.000 | | | | |
| 8 | EVEN ASPHERE LENS | 0.000 | 4.000 | 0.000 | 0.000 | 0.000 | PMMA | 4.164 | 2.195 | |
| 9 | EVEN ASPHERE LENS | 0.000 | 9.101 | 0.000 | 0.000 | 0.000 | POL. | 3.196 | 1.000 | |
| 10 | AMULLN | 0.000 | 10.101 P | 0.000 | 0.000 | 0.000 | | 8.000 | 8.000 | 3.196 |
| 11 | DETECTOR COLOR | 0.000 | 81.000 P | 0.000 | 0.000 | 0.000 | ABS. | 75.000 | 75.000 | 251 |

FIG. 12

| | TYPE | | SUI | | NOMINAL | MIN | MAX |
|---|---|---|---|---|---|---|---|
| 1 | TWAV | ▶ | | | 7.635 | 0.633 | |
| 2 | TRAD | ▶ | 1 | | 213.811 | −0.219 | 0.260 |
| 3 | TRAD | ▶ | 2 | | 5.247 | −98.419 | 899.310 |
| 4 | TRAD | ▶ | 3 | | −57.082 | −0.505 | 0.749 |
| 5 | TRAD | ▶ | 4 | | 1.000 | INF | 38.459 |
| 6 | THI | ▶ | 1 | 2 | 6.906 | −0.495 | 0.657 |
| 7 | THI | ▶ | 2 | 4 | 2.195 | −0.261 | 0.260 |
| 8 | THI | ▶ | 3 | 4 | 3.241 | −0.500 | 0.804 |
| 9 | THI | ▶ | 4 | 5 | 0.000 | −0.204 | 0.192 |
| 10 | TDY | ▶ | 1 | 2 | 0.000 | −0.195 | 0.195 |
| 11 | TEX | ▶ | 1 | 2 | 0.000 | −3.022 | 3.022 |
| 12 | TEY | ▶ | 1 | 2 | 0.000 | −4.670 | 4.670 |
| 13 | TDY | ▶ | 3 | 4 | 0.000 | −0.195 | 0.195 |
| 14 | TEX | ▶ | 3 | 4 | 0.000 | −3.125 | 3.125 |
| 15 | TEY | ▶ | 3 | 4 | −1.148 | −13.441 | 13.441 |
| 16 | TCON | ▶ | 1 | | 100.000 | −0.695 | 0.531 |
| 17 | TCON | ▶ | 2 | | −1.414 | 50.000 | 150.000 |
| 18 | TCON | ▶ | 3 | | −16.534 | −1.617 | 0.951 |
| 19 | TCON | ▶ | 4 | | | −50.000 | 0.000 |

FIG. 15

MINIATURE LOGO PROJECTOR DESIGN FOR AUTOMOTIVE INTERIOR LIGHTING

FIELD OF INVENTION

This invention relates to the field of display and illumination. More particularly, it relates to a projector for displaying an image such as a logo in or near a vehicle. Such a projector may be limited to two lenses while maintaining high image quality.

BACKGROUND

A vehicle interior is provided with various displays and illuminated components. A logo, such as a vehicle brand logo or pattern, is provided throughout an automotive interior for aesthetics, branding, or even personalization. Illuminated displays can improve a luxury aesthetic. However, many built-in displays can be expensive, take up limited space, or lack a high-end finish. Likewise, projectors can be expensive, use up space, or lack clarity. With internal applications of projectors in limited space, a shorter track length can minimize housing and fewer plastic lenses can lower cost. In such a system, aberrations in distortion and color are frequently induced.

In external applications, as a user approaches the vehicle, logo projection welcomes the user by projecting a logo or an image onto the ground. There is, however, a limited amount of space available to mount this projector inside a door. Fewer lenses or lens elements reduce space; however, they are subject to high aberrations and cause defocus of the logo image. Typically if higher image clarity is needed, then the number of lens elements must increase, which increases the track length.

Thus, there is a need for an automotive display system that is cost effective and minimizes space while providing a high-quality image. It would be advantageous to provide a display system which, within design constraints, can be situated in a tiny space, built with very thin plastic materials, perform aberration corrections, and satisfy a zero telecentricity condition.

This invention addresses miniature projector design requirement by selecting only two lens elements for logo projector design while maintaining image clarity and uniformity.

SUMMARY

In a first aspect, the present invention provides for a logo projector having an LED light source (single color or RGB multi-color), a condenser, a logo to be projected, and first and second imaging lenses. The logo projector has a track length of less than 15 mm. The logo projector produces a resulting image on a target surface.

In another aspect, the present invention provides a projection system, having a logo projector and a target surface. The target surface is tilted at about 30 degrees relative to the logo projector and the screen is located at a distance of about 75 mm from the logo projector.

In still another aspect, the present invention provides a vehicle logo display system having a logo projector and a screen. The logo projector is mounted in a first vehicle location. The target surface is at a second vehicle location.

This invention provides an optical design intended for automotive applications. For this projector, a shorter track length is used to minimize housing and a limited number of plastic lenses are used to minimize cost. In a typical system like this, most induced aberrations are distortion and color. Using modern lens design software, starting configurations are satisfied to meet all the first order properties. Merit functions are then defined for optimizing the lens such that distortion is limited to 2% and telecentric conditions are satisfied, while making sure that no cemented surfaces are used. Design tradeoffs are then conducted to make sure the best lens configuration is selected to meet most important design specification(s). A two-element design helps reduce the cost of bulk production while providing lower risk for tolerance offset.

The present invention provides for a logo projector for miniature applications, including an LED light source, a condense lens, an opaque logo, an imaging lens, an absorbing housing, and a power supply.

The present invention also provides a projection lens module for a miniature projector containing only two lenses, including the first lens having a plane convex lens, with both lenses having a high order aspheric surface.

BRIEF DESCRIPTION OF THE DRAWINGS

FIG. 9 is a spot size diagram for the logo projector of FIG. 5;

FIG. 12 is a table of non-sequential layout ghost analysis for the logo projector of FIG. 5;

FIG. 15 is a tolerancing table for the logo projector of FIG. 5;

DETAILED DESCRIPTION OF THE PREFERRED EMBODIMENTS

Figure 1:
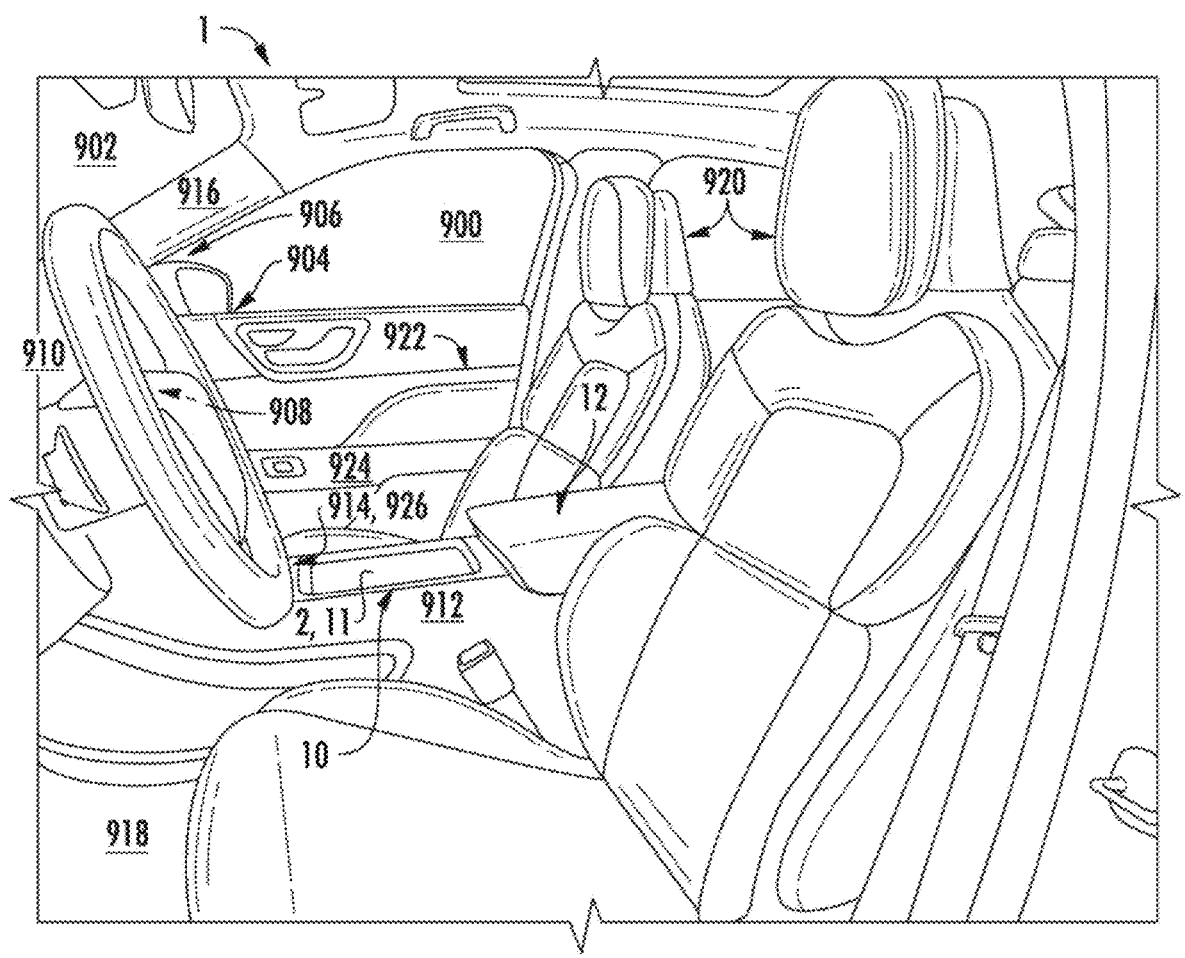
FIG. 1 is a perspective view of an exemplary vehicle cabin according to an embodiment of the present application.

At the outset, it should be appreciated that this invention is not limited only to the particular embodiments, methodology, materials and modifications described herein, and as such may, of course, vary. Certain terminology is used in the following description for convenience only and is not limiting. The word "logo" indicates one type of image produced by a projector, but various images and texts may be projected as desired. Therefore, the term 'logo projector' as used herein is not limiting and is applicable to a range of projector outputs including logos, patterns, trademarks, images, text, and the like. The words "vertical" and "horizontal" designate directions in the drawings to which reference is made. The terminology includes the words specifically noted above, derivatives thereof and words of similar import. "About" and "approximately" as used herein when referring to a measurable value such as a distance, an angle, and the like, are meant to encompass variations of ±5% from the specified value.

FIG. 1 shows an exemplary vehicle cabin 1 including a center console 10 and an armrest 12. As discussed below, in an embodiment of the present application, a projector 40 is mounted in a desired location within the vehicle cabin 1, such as in the armrest 12, and the projector is directed toward a surface of the vehicle cabin, such as a flat upper surface 11 of the center console 10. Any such target surface 70 may also be referred to as a screen 70 for the projector 40.

Figure 2:
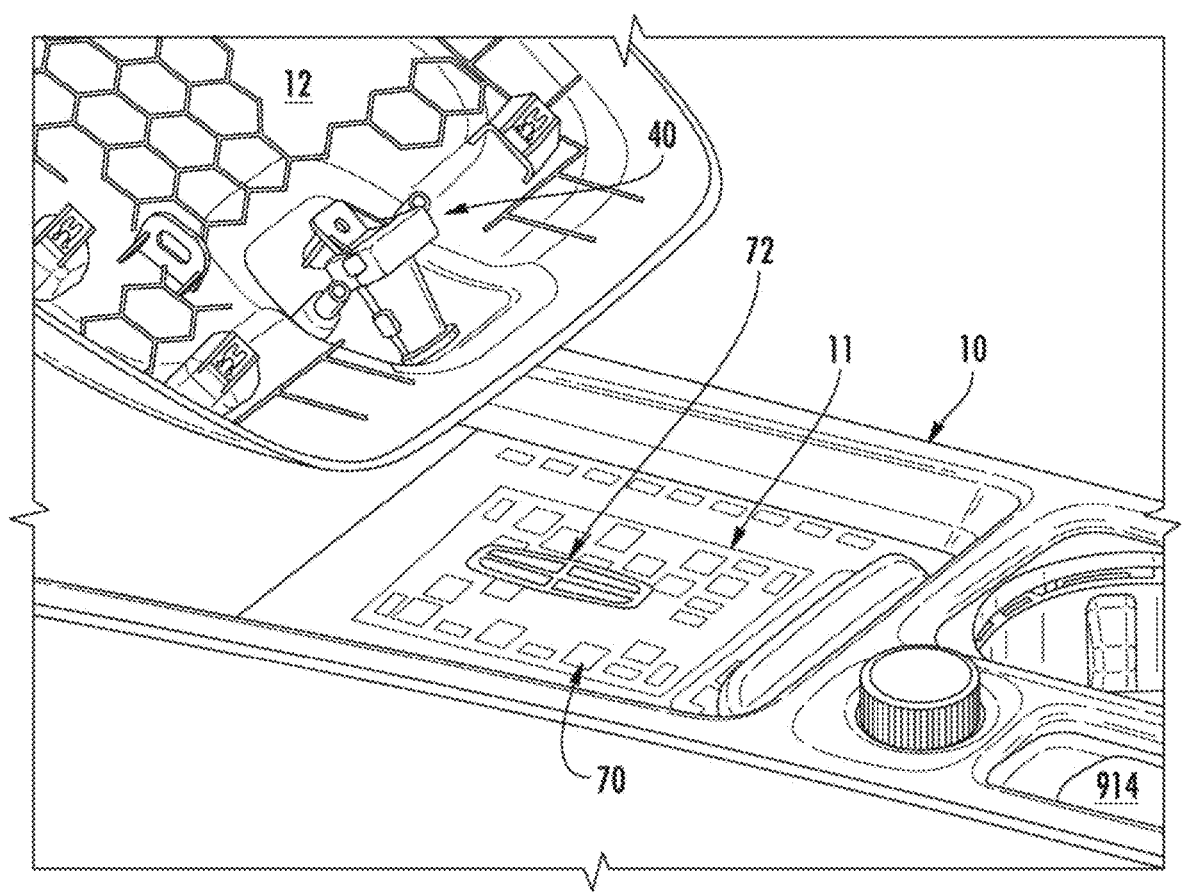
FIG. 2 is a partial perspective view of a center console of the vehicle cabin of FIG. 1.
Figure 3:
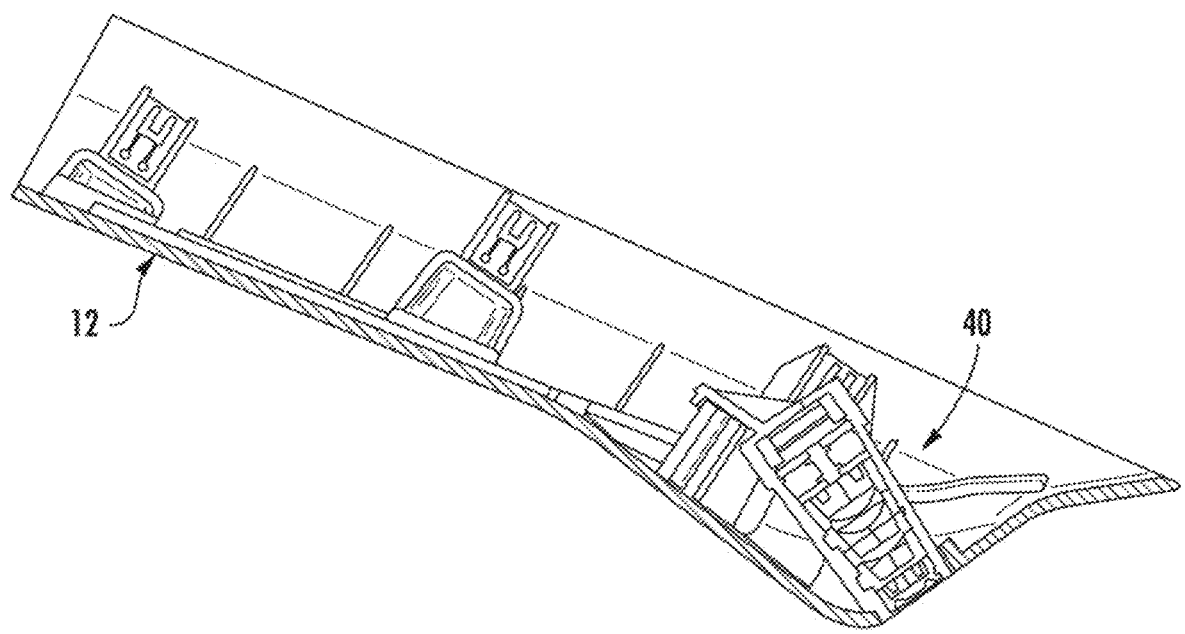
FIG. 3 is a partial side cross-sectional view of an armrest of the center console of FIG. 2.

FIGS. 2 and 3 show an exemplary embodiment of the present invention with a partial view of the center console 10 and the armrest 12 of a vehicle including a projector 40. As shown, the target surface 70 (here, defined by the upper surface 11 of the center console 10) is angled relative to the logo projector 40 but a resulting logo 72 has proper expected appearance/proportion without distortion.

Figure 4:
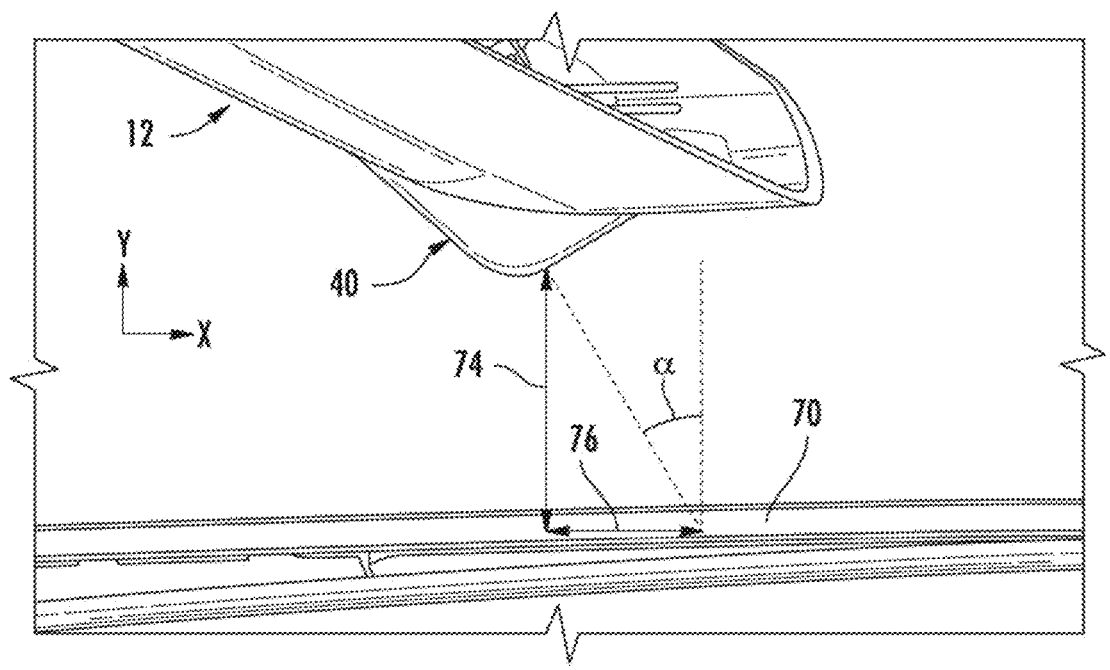
FIG. 4 is a partial view of the center console of FIG. 2.

As shown in FIG. 4, the relative dimensions between the projector 40 and the target surface 70 are shown. A vertical (or y-direction) distance 74 and a horizontal (or x-direction) distance 76 define an angle α between the projector 40 and the screen 70. As discussed below, the projector 40 is designed to compensate for the angle α in producing the resulting image 72 as desired. In the exemplary embodiment, the vertical distance 74 is 43 mm and the horizontal distance 76 is 62 mm resulting in the angle α being about 30 degrees and the distance from the logo projector to a center of the resulting image 72 is at a distance of about 75 mm from the logo projector.

Figure 5:
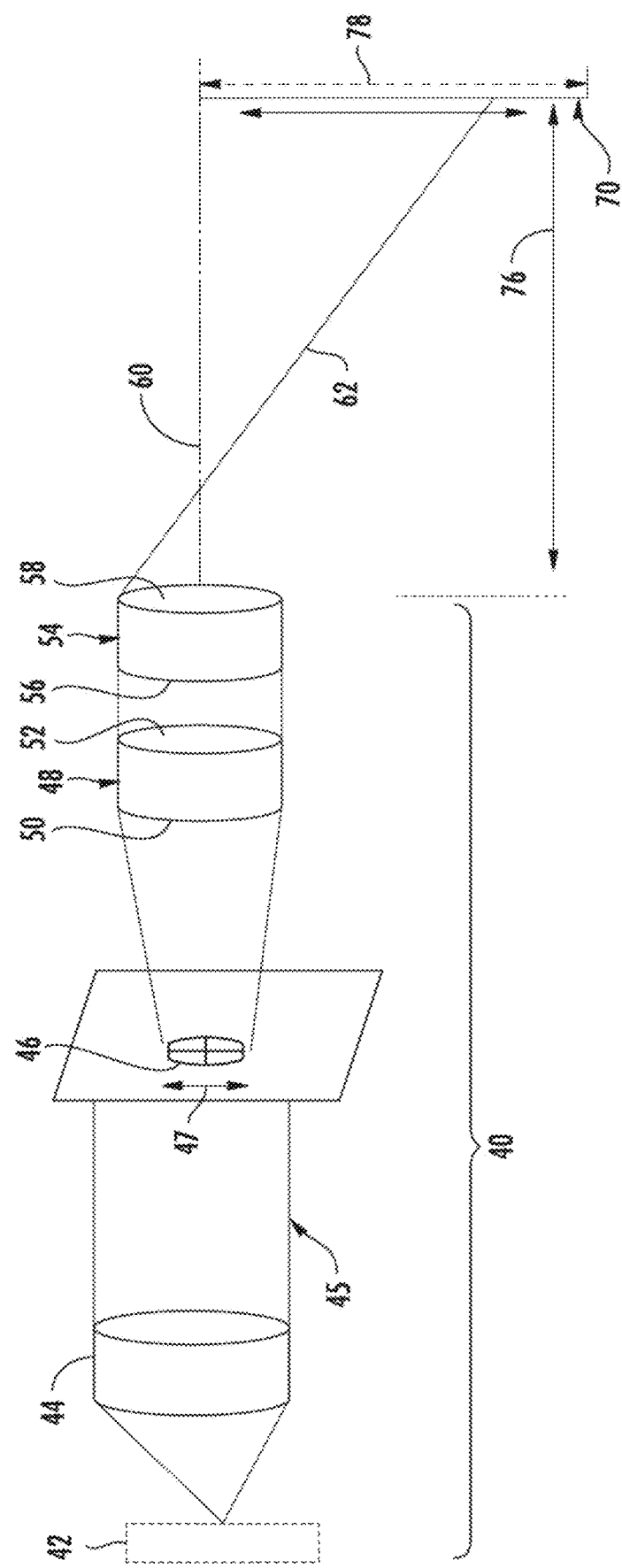
FIG. 5 is a schematic view of a logo projector according to an embodiment of the present application.
Figure 6:
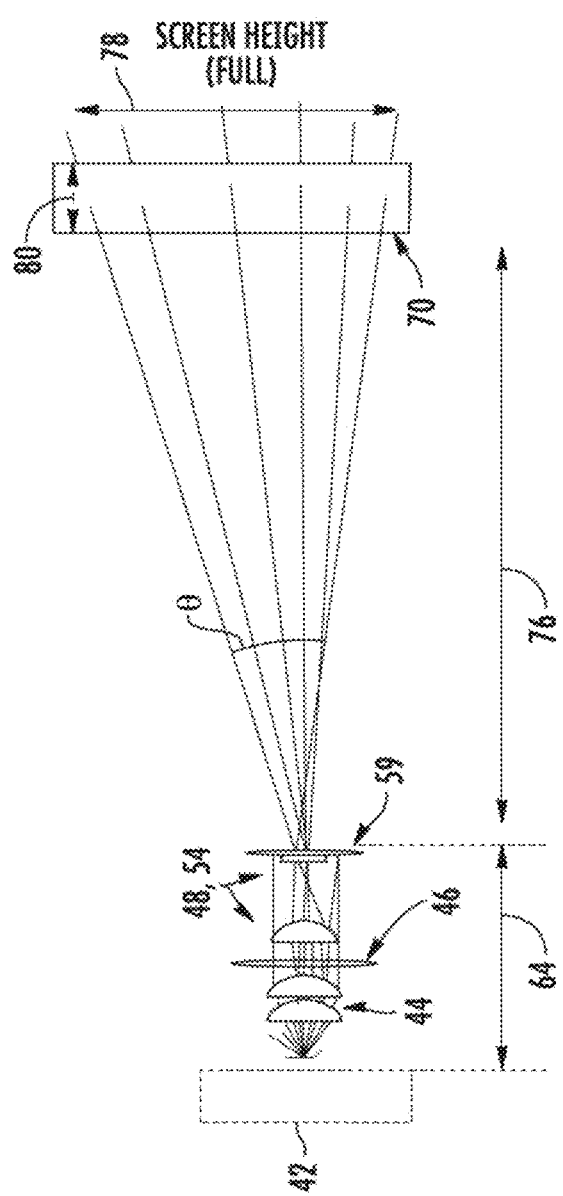
FIG. 6 is a non-sequential Zemax layout of the logo projector of FIG. 5.

Turning to FIGS. 5 and 6, the exemplary logo projector 40 is schematically illustrated in FIG. 5 and a non-sequential Zemax layout of the projector is shown in FIG. 6. A light source 42, for example an LED light, is directed to a condenser 44. Collimated light 45 from the condenser 44 then proceeds to a logo film 46 followed by one or more imaging lenses 48, 54. For the illustrated embodiment, two imaging lenses 48, 54 are provided, although other amounts are contemplated, including three, four, five, six, or more imaging lenses. A first imaging lens 48 has a first surface 50 and a second surface 52, and a second imaging lens 54 has a first surface 56 and a second surface 58. The projector 40 outputs to define an optical axis 60. A marginal ray 62 is directed toward a target surface ("screen") 70 having a screen height 74.

Figure 7:
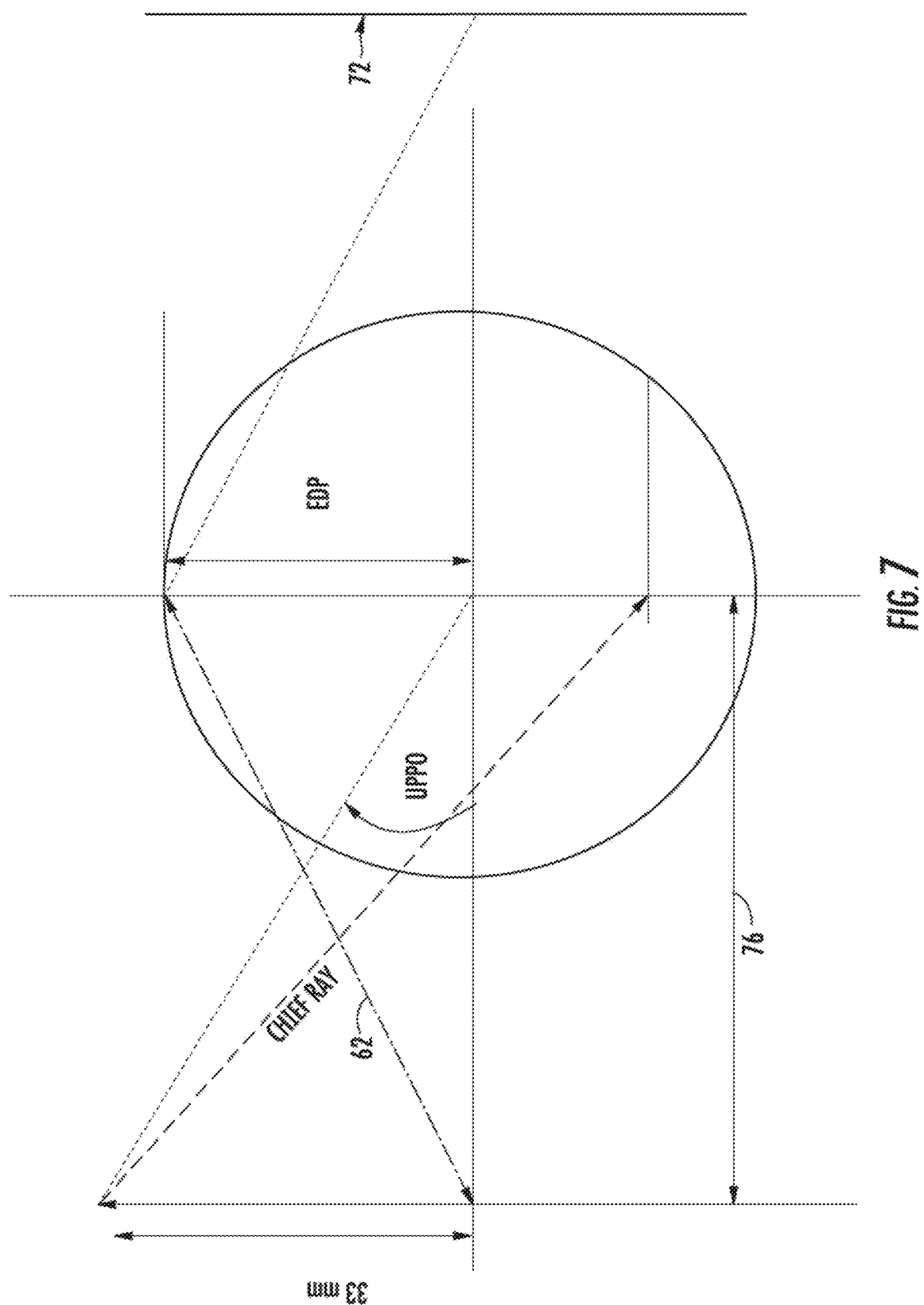
FIG. 7 is an illustration of relevant geometry for setting up the logo projector of FIG. 5.
Figure 8:
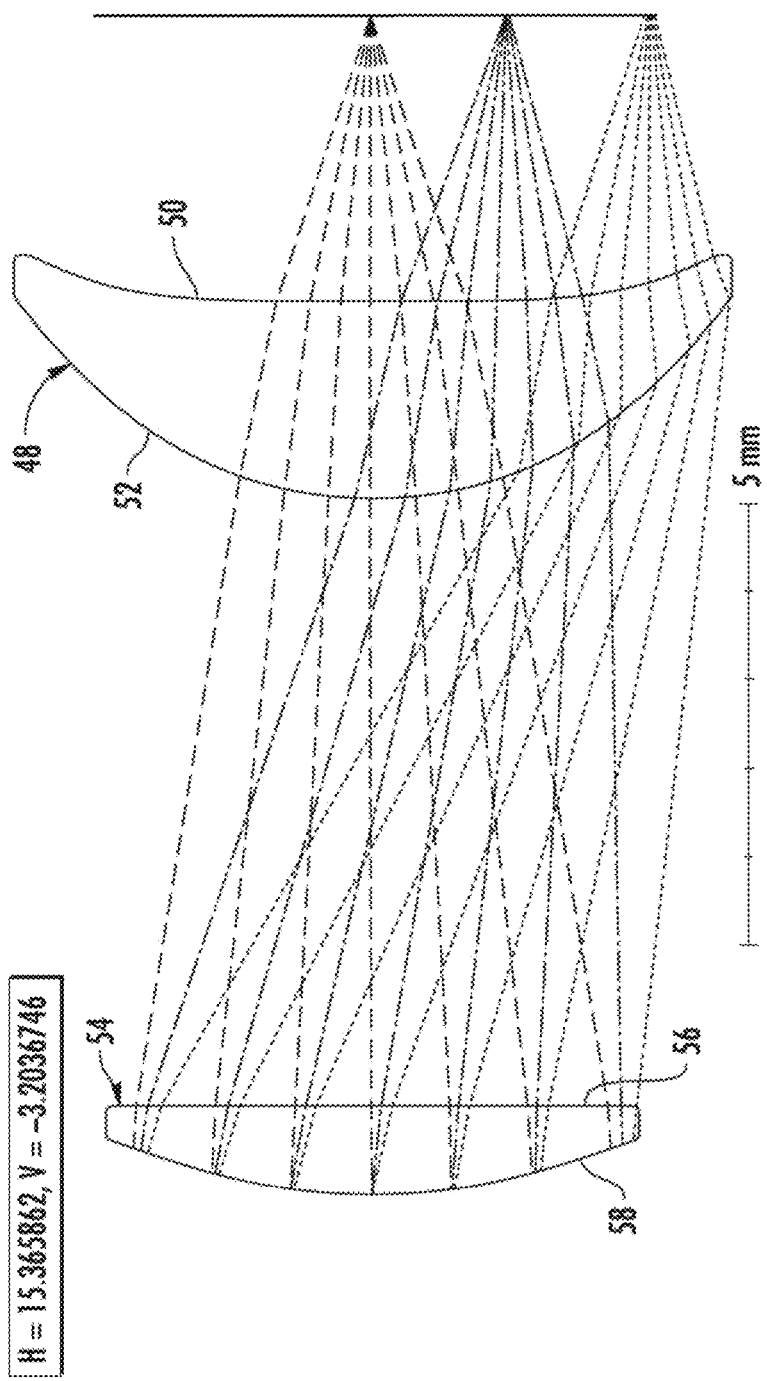
FIG. 8 is a lens layout plot for the logo projector of FIG. 5.

The condenser lens 44 and the imaging lens(es) 48, 54 are designed to meet certain design requirements and constraints for a desired application. Requirements in the exemplary embodiment include: a constraint on track length 64 (i.e., total lens length including the back focal distance), number of allowed elements, screen height 78, screen distance 76, a logo film height 47, and material properties. FIGS. 6 and 7 illustrate these terms. The lenses 44, 48, 54 may be made of a plastic material, such as Poly(methyl methacrylate) ("PMMA") or Poly(carbonate) ("PC") to reduce weight and costs while improving durability.

Initial design of the projector 40 may be done in reverse configuration to define projector properties such as FOV, throw ratio, and other 1st order properties. A reverse configuration is the same as an imaging camera configuration and is shown by FIG. 7. After the imaging lens 48, 54 and condenser lens 44 are constructed, they are combined together by reversing the lens elements. A final projector 40 configuration is a forward projection system that takes the light source 42 (e.g., LED), which then collimates through the condenser lens unit 44, propagates through the lenses 48, 54 to a target surface 70 at a specific distance 76 and height 78 with uniform brightness.

In general, a clear aperture of the condenser lens 44 will be slightly greater than the projected logo height 78. In one embodiment, the number aperture NA of condenser lens 44 is sized to capture as much Lambertian LED flux as possible. Specifically in the exemplary embodiment, a NA of 0.6 captures 60 degrees Full Width, Half Max (FWHM) of LED light source 42 intensity. For this design, PMMA or PC material was used.

For imaging optics in one exemplary embodiment, the following requirements may be considered for the logo projector 40. Design variables may include: spectrum range, system, screen height 78, object height 47, telecentricity, field of view (FOV) Θ, track length 64, back focal distance, lens material(s), distortion, and logo height 78.

Track length 64 is the distance between a logo film 46 and a last projector lens surface 58 and exemplary embodiments may target a maximum track length of about 5 mm to about 25 mm, about 10 mm to about 20 mm, or any values or sub-ranges therebetween. Telecentricity is also important to projector performance because it reduces the effect of non-uniformity of the imaging plane. For ideal projection, telecentricity may be targeted at less than, for example, about 5 degrees, about 4 degrees, about 3 degrees, about 2 degrees, or about 1 degree. However, telecentricity is not the only factor in determining uniformity of the image on the detector plane. A sag profile of the image lens 54 last surface 58 may play an important role in maintaining the uniformity. A flatter last surface 58 of the lens 54 results in better uniformity. The present application is directed to achieving the best uniformity of the image on the detector surface.

In one exemplary embodiment, field of view (FOV) is defined as atan(30/80), i.e., approximately 21 degrees. EPD and F/# are controlled to manage an image size of about 3.5 mm. Larger F/# is intended because that limits the amount of aberration into the system, however larger F/# will increase the image size. Balancing these is important to design of the system to satisfy the particular requirements of an embodiment.

For illumination of an exemplary embodiment, light source 42 was a rectangular white LED placed in front of the focal plane of the condenser lens 44. Using Zemax non-sequential mode, the system was simulated with 20 million rays, as illustrated in FIG. 5. A Kohler illumination was performed to check for the uniformity and image performance. The size of the image 72 was compared to the object height specification, and, as shown in FIG. 6, peak intensity of 640 lumen/$m^2$ was measured.

Two exemplary lens materials applicable to the present disclosure are PMMA and PC. Plastic lenses with no cemented structures are generally suitable. This is partly due to cost concerns. Center thickness may be less than or equal to 10 mm to avoid unnecessary thickness. Edge thickness was kept over 0.6 mm for simplified manufacturing.

Tradeoffs among various design factors are shown in Table 1 below. Correcting chromatic aberrations is difficult due to the relatively small number of plastic lenses. The present application is therefore directed toward minimizing, rather than eliminating, chromatic aberrations. The exemplary design trade off of Table 1 was done with aspheric, conic and a combined of aspheric and conic lens surfaces. Applicable designs require a selection of a combination of track length, rms spot size, telecentricity, image size, and distortion correction.

In selecting projectors where miniaturization is the most important requirement, for example when the projector 40 must be embedded within a relatively small volume, configurations that provide a reasonable performance but have a reduced track length, such as Design 16, may be preferable.

For optimization of the present disclosure, lens prescription may be evaluated. Merit function(s) may target the following: auxiliary color, lateral color, distortion, field curvature, and telecentricity for both half- and full-field.

TABLE 1

Exemplary designs.

| Design | Conic | Aspheric | RMS Spot Size | Glass | Image size (mm) | Telecentricity (deg) | Distortion (%) | Track Length (mm) |
|---|---|---|---|---|---|---|---|---|
| 1 | X |   | 33,82,32 | PMMA PMMA | 3.7 | <3 | <10 | 14.29 |
| 2 | X | X | 18,61,74 | PMMA PMMA | 3.6 | <6 | <5 | 14.4 |
| 3 | X | X | 20,60,36 | PMMA PMMA | 3.6 | <10 | <1 | 14.8 |
| 4 | X | X | 18,61,74 | PMMA PMMA | 3.6 | <6 | <5 | 14.4 |
| 5 | X | X | 55,81,63 | PMMA POLY | 3.2 | <2.5 | <5 | 13.41 |
| 6 | X | X | 19,77,39 | PMMA PMMA | 3.5 | <7 | <2 | 13.9 |
| 7 | X | X | 49,15,42 | PMMA POLY | 3.1 | <1.5 | <5 | 14.02 |
| 8 | X | X | 25,87,69 | PMMA POLY | 3.9 | <1.5 | <5 | 15.6 |
| 9 | X | X | 26,94,59 | PMMA POLY | 3.6 | <6 | <1 | 13.6 |
| 10 | X |   | 30,61,38 | PMMA PMMA | 3.5 | 2 | <0.2 | 15.2 |
| 11 | X | X | 25,55,29 | POLY PMMA | 3.18 | 3.6 | <1 | 13.9 |
| 12 | X | X | 19,46,57 | POLY PMMA | 3.3 | 7.8 | <2 | 13.85 |
| 13 | X |   | 17,68,49 | POLY PMMA | 3.18 | 5.7 | <0.5 | 11.9 |
| 14 | X | X | 35,54,33 | PMMA POLY | 3.15 | 4.3 | <2 | 11.9 |
| 15 | X | X | 16,70,34 | PMMA POLY | 3.3 | 3 | 5 | 11.3 |
| 16 | X | X | 27,62,31 | POLY PMMA | 3.3 | 0 | 1 | 13.3 |

For each design, a stop 59 is provided after the second lens 54 to maintain telecentricity. Having a stop 59 between the lenses 48, 54 (as in a symmetric design) can correct off-axis aberrations, but is harder to maintain the desired telecentricity as per above.

The illustrated embodiment of the present disclosure embodies Design 16 from Table 1 above. Although Designs 13 and 14 have smaller track lengths 64, telecentricity was not at the target criterion. Design 16 on the other hand has relatively low distortion, zero degree telecentricity, and relatively short track length while providing an image size of 3.3 mm, which was the design target. This design also has a relatively small RMS spot size radius (see FIG. 9). With only two lenses 48, 54 there are physical limitations to correct any wavefront errors further. If a number of lens elements are increased it adversely affects the track length 64. As noted above the exemplary system may be confined inside a relatively short track length and thus a two-lens configuration may be desirable. Having one lens type and only two lenses 48, 54 is also more cost effective in large volume production.

FIGS. 8-11 show Seidel surface contributions for the lens. In particular, in FIG. 8, a lens layout plot is shown. This plot shows the projector 40 in reverse/camera configuration. An aspheric surface is used in the last lens 54 to fit the lens in a 15 mm total track length 64. In an actual projector such as the exemplary projector 40, this configuration is reversed whereby the lenses 48, 54 take the logo image 47 and project it on the target surface 70.

In FIG. 9, a spot diagram is shown. This spot diagram shows that, on axis and half field focusing, a spot radius is about 30 micron. Generally, a smaller radius correlates to a better focusing capability. However, using a plastic lens, the full field spot radius is about 60 micron. On average the spot radius is about 40 micron.

Figure 10B:
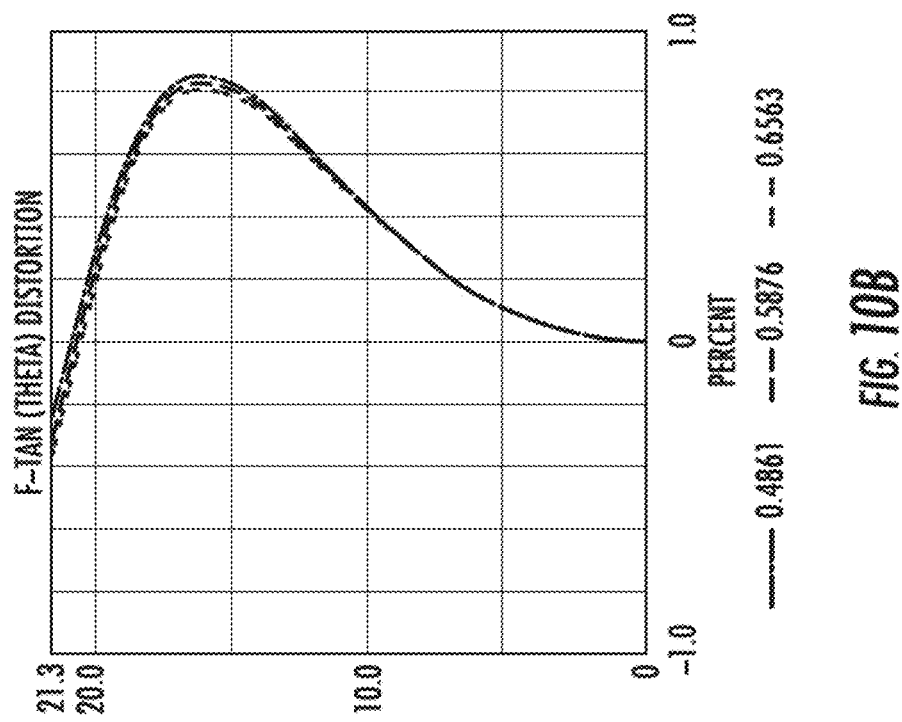
FIG. 10B is a distortion plot for the logo projector of FIG. 5.
Figure 10A:
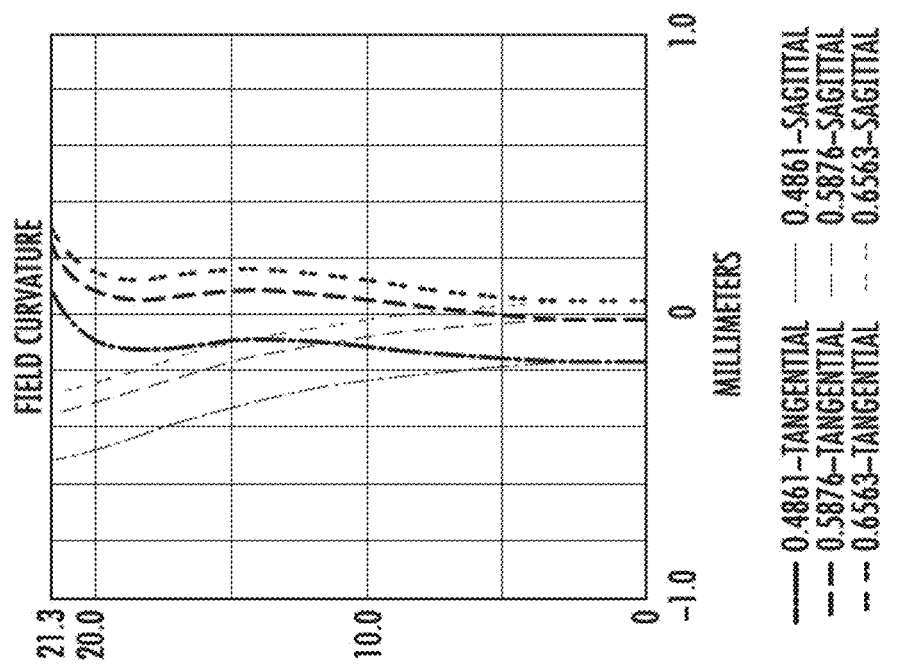
FIG. 10A is a field curvature plot for the logo projector of FIG. 5.

FIG. 10A shows a field curvature plot and FIG. 10B shows a distortion plot for the exemplary embodiment of the present application. As illustrated, distortion is kept below 1% using a higher order aspheric surface. For the exemplary embodiment (Design 16 in Table 2), the field curvature and distortion both are acceptable and distortion is kept less than 0.2%. There is spherical aberration and longitudinal chromatic aberration in the system. Spot diagram can be less than 60 microns on a high field. However, given the track length and limit to only two plastic lenses, this is the best performance attainable. More lenses would provide much better results. Therefore, the present application is a diffraction-limited system. A balanced design approach is taken keeping in mind customer needs, existing housing, and most importantly, cost.

Figure 11:
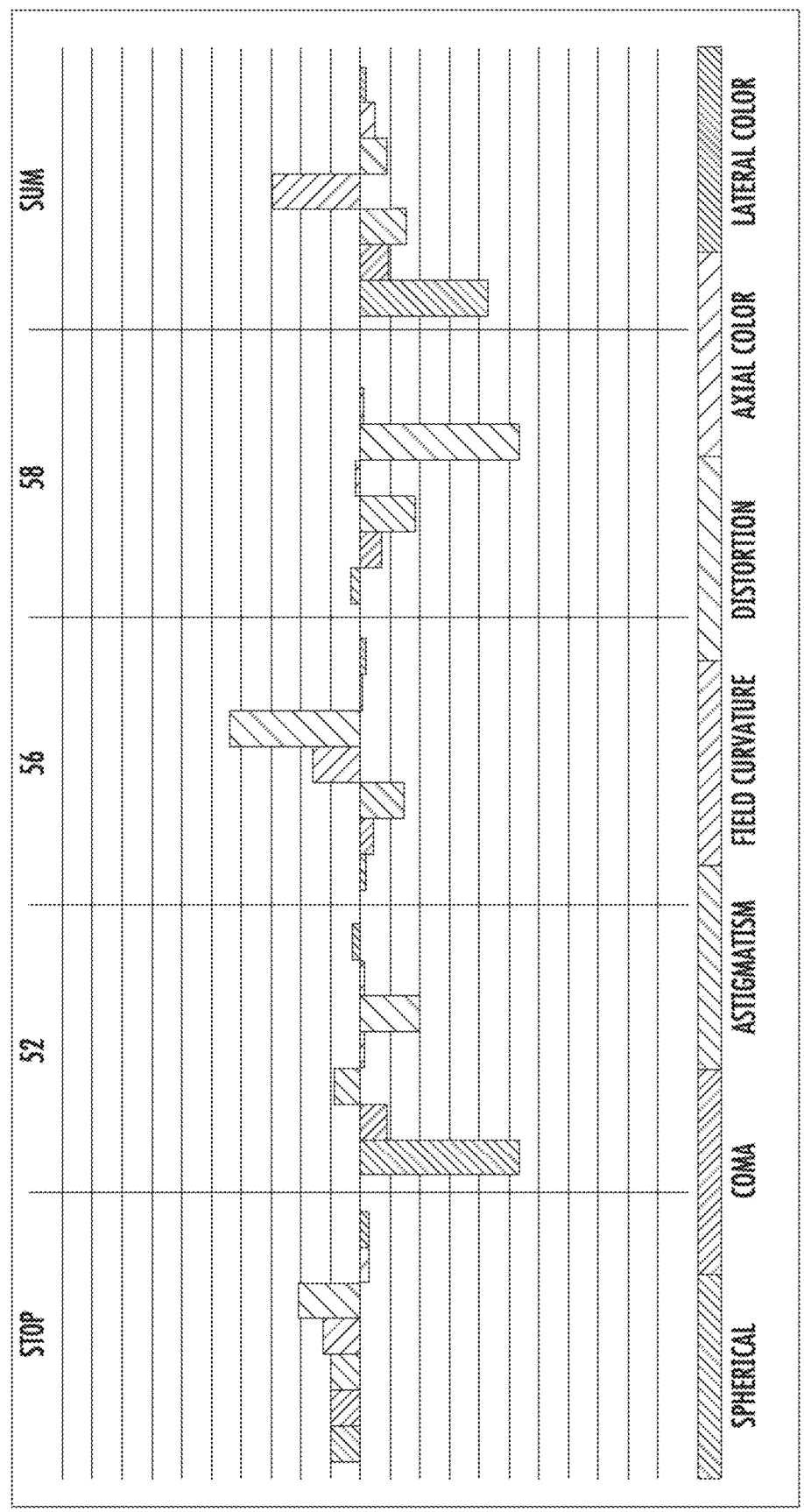
FIG. 11 is a plot of surface aberration contributions for the logo projector of FIG. 5.

In FIG. 11, a plot of Seidel sums indicates Seidel surface contributions of the lenses 48, 54 in the exemplary embodiment. In this plot, a wavelength is 0.5876 µm, a maximum aberration scale is 0.50000 mm, and grid lines are spaced at 0.05000 mm. This plot can be used to optimize the lens(es) 48, 54 for greater image clarity. The first column shows lens surface 50/52/56/58 where the stop 59 was placed. The last column shows the sum of all aberrations in the system. The bars are representation of various aberrations in the system. This plot shows the surfaces 56 and 58 suffer from distortion while spherical aberrations are primarily contributed by surface 2.

Figure 13:
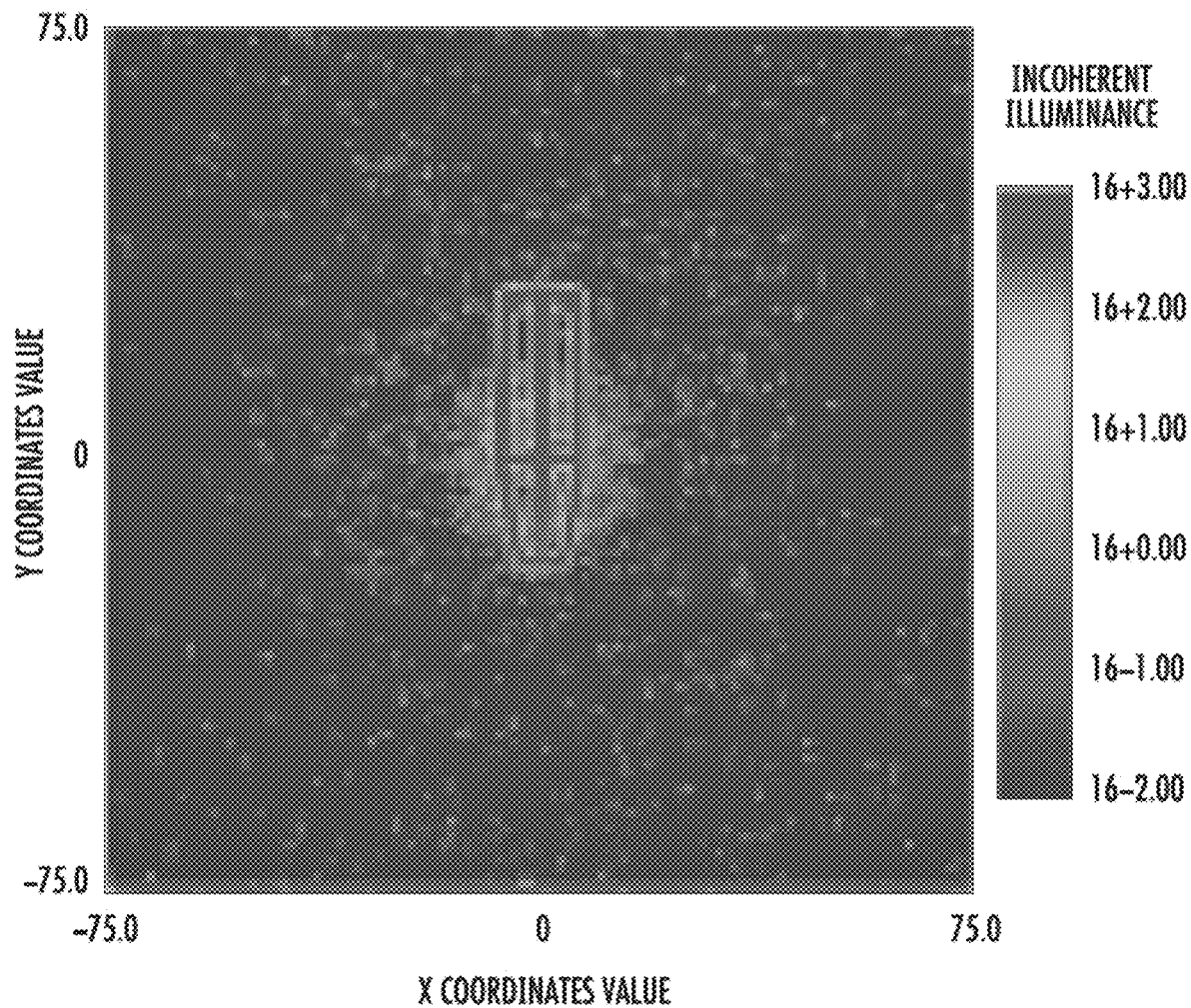
FIG. 13 is a ghost analysis image.

FIGS. 12 and 13 illustrate a ghost analysis for the resulting logo 72 of the exemplary embodiment. The ghost analysis was performed by setting up the imaging and the condenser lenses in a forward configuration. In non-sequential mode, a total of 20 million rays were traced using 10 Lumen lambertian source and random sampling. A 3-D layout of a non-sequential mode is shown in FIG. 13. Using non-sequential ray tracing, stray lights reaching the detector were identified using log 5 scale and true color plot. Screen plane is identified as a detector object in non-sequential layout. Ghost analysis is done primarily to identify the surface(s) 50/52/56/58 that contribute to the stray light in order to apply anti-reflection (AR) coating on those surfaces to mitigate the stray light effect.

The ghosting in an optical system is also analyzed/simulated since internal reflection from multiple surfaces can degrade the overall image quality. Off-axis rays from LED through the logo are included in the ghost simulation. However, for the exemplary logo projector 40, scattering may generally be not as important because the scatter model of the chosen plastic material may be unknown.

The exemplary embodiment of the present application mitigates axis bouncing of rays between the lens surfaces 50/52/56/58, which can cause light to bounce toward the target surface 70. This mitigation is done by isolating and identifying surfaces that contribute the most stray light while illuminated and then applying anti-reflective (AR) coating on them.

Figure 14A:
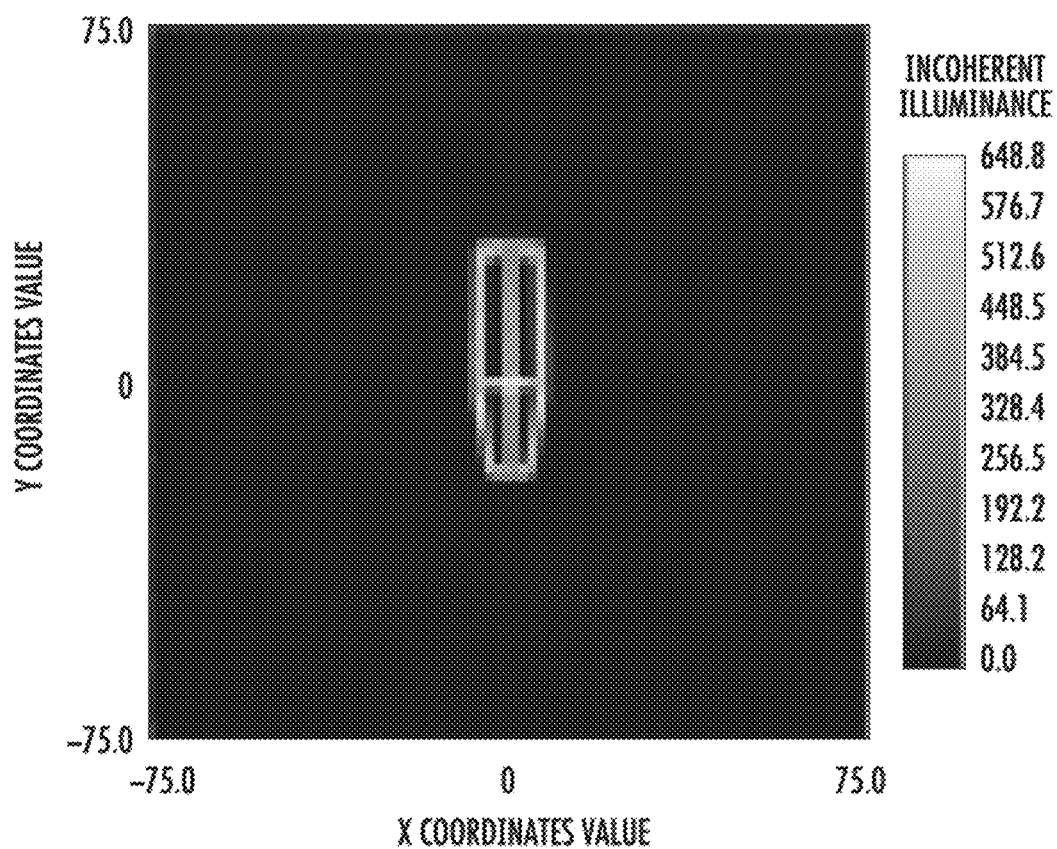
FIG. 14A is an illumination diagram of a skewed logo produced by the logo projector of FIG. 5.
Figure 14B:
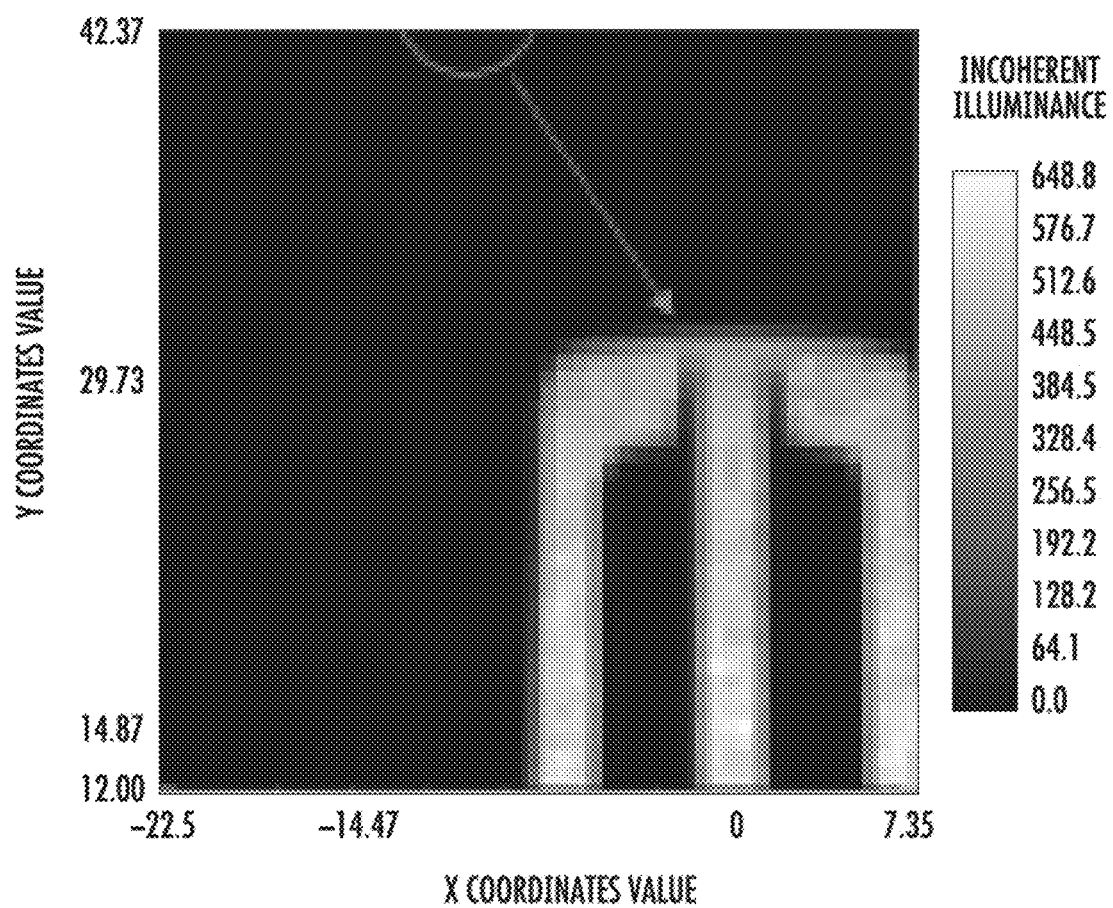
FIG. 14B is a zoomed partial view of the diagram of FIG. 14A.
Figure 16:
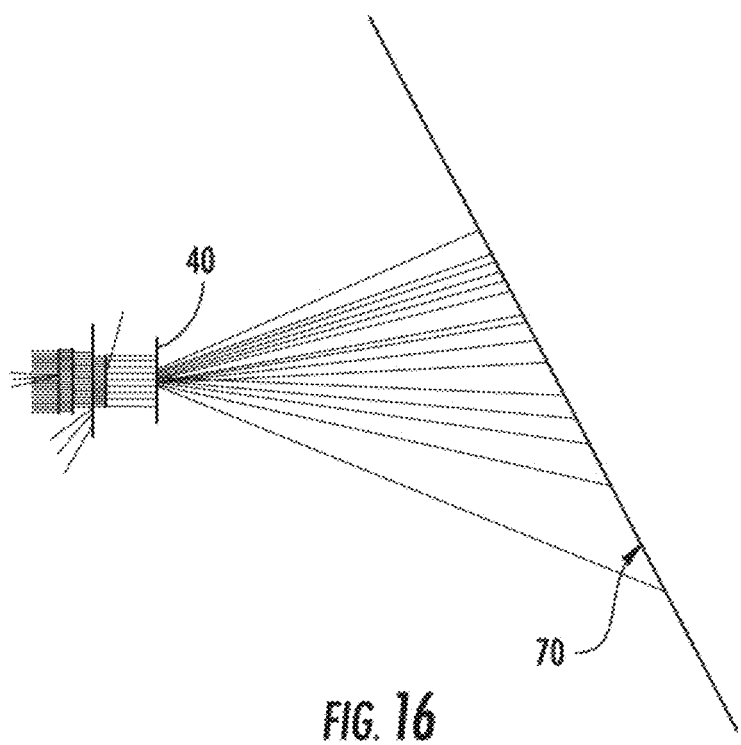
FIG. 16 is a non-sequential Zemax plot with a screen tilted relative to a logo projector.

In the exemplary embodiment, the tilted target surface plane requirement is thirty degrees. FIG. 16 is a plot using non sequential Zemax simulation showing the tilted plane of the target surface 70. To correct the distortion effect of a resulting image 72 on the tilted screen plane 70, the logo 46 within the projector 40 was designed using a skewed image. Light propagating through the skewed image cancels the distortion effect of the tilted plane of the target surface 70 and thus corrects tilt-related skew effect and maintains image uniformity. The skew of the logo 46 is obtained by reverse ray tracing from the tilted screen plane to the object plane. FIGS. 14A and 14B provide an example generated with the logo 46 as a skewed Lincoln® logo.

Figure 17:
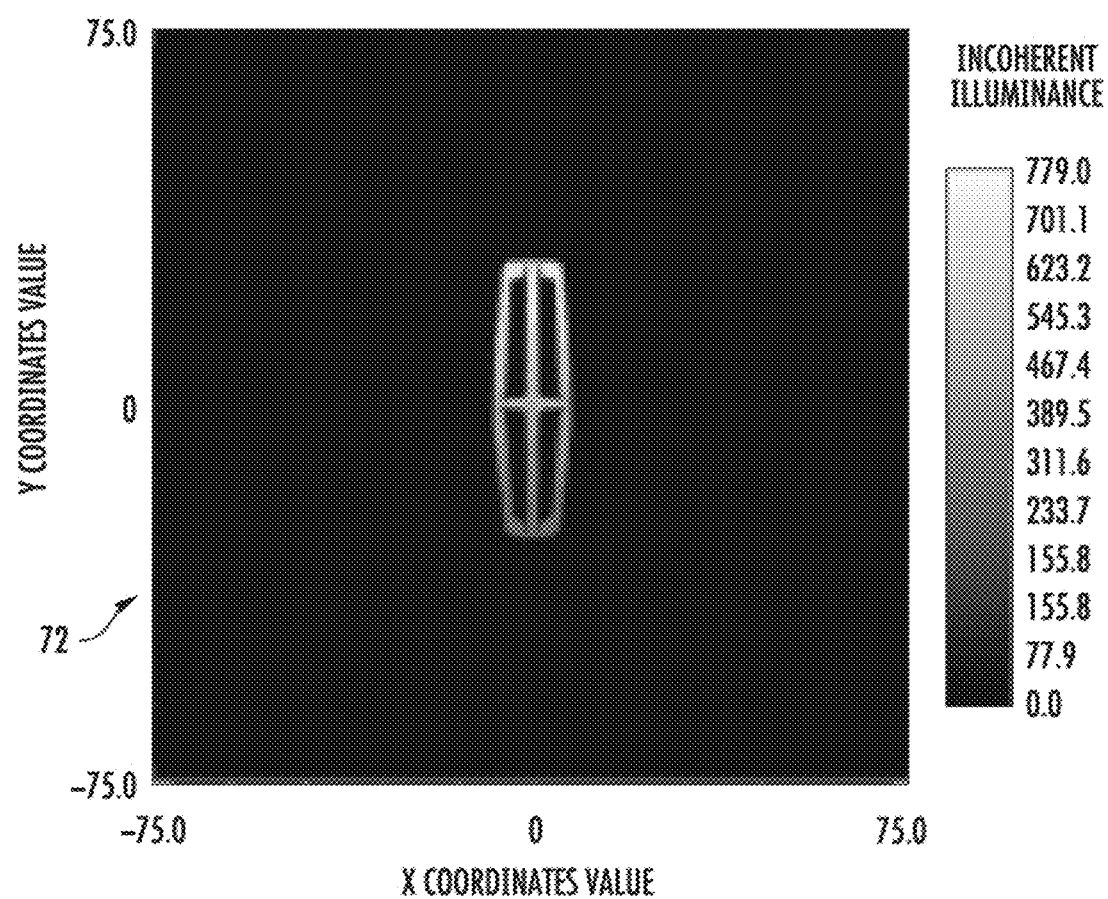
FIG. 17 is a projected image of the skewed logo of FIG. 14A on the tilted screen of FIG. 16.

Uniformity of the resulting image 72 is shown in FIG. 17. The uniformity curve is somewhat tilted to the right due to using skewed image 46 for the 30 degree tilt of the target surface 70; apart from that, proper uniformity is maintained throughout the image 72.

FIG. 15 shows tolerancing results along with expected sensitivity to manufacturing tolerance. Tolerance analysis may also be performed in designing the projector 40 of the present invention. During manufacturing, a small change in any of the lens 48, 54 parameters can severely degrade system performance. On the other hand, setting tolerances too tight can be costly. In the exemplary embodiment, an RMS spot size was set as tolerance criterion. Measurement of standard deviation from the nominal provides an estimate of how well the design meets the manufacturing goal. In the exemplary embodiment, with RMS spot degradation assigned to 50% and the on-axis RMS spot variance set to not exceed 0.5 (or 50%), performance was evaluated. The nominal merit function on RMS spot size was 0.042 with a predefined 50% increment. Accordingly, the tolerances on the parameters in the tolerance data editor will be reduced if the merit function gets bigger than 0.063 (i.e., 0.042+0.021). The criterion may be represented as (lens parameter+max tolerance)<(Nominal Criterion+increment). After performing inverse sensitivity analysis, allowable tolerance is modified so that it can meet the requirement of RMS spot size less than 50% degradation from the nominal. One skilled in the art would appreciate that known abbreviations are used in the above figures tables, for example, TRAD in FIG. 15 is a radius of curvature.

One skilled in the art would appreciate that the logo projector 40 and target surface 70 of the present application may be used in various locations about a vehicle cabin 1. As non-limiting examples shown in FIG. 1, the target surface 70 could be defined by other vehicle cabin locations including: a window 900, a windshield 902, a rear view mirror 904, a housing/mount 906 for the rearview mirror, a glovebox 908, a dashboard 910, a side 912 of the center console 10, a forward portion 914 of the center console, a pillar 916, a floor 918, or the like. As further non-limiting examples, the logo projector 40 could be mounted in or on vehicle cabin locations including: the rearview mirror 904, a mount/housing 906 for the rearview mirror, the glovebox 908, the dashboard 910, a portion of the center console 910, a headrest 920, any other armrest 922, a door panel 924, an instrument panel 926, a pillar 916, or the like. In exterior applications, the projector likewise can be provided in any suitable area of the car, with non-limiting examples (not illustrated) including a door, door handle, quarter panels, pillars, roof, and/or roof rack.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A logo projector, comprising:
an LED light source configured to produce light;
a condenser configured to receive the light from the LED light source and output substantially collimated light;

a logo to be projected that is configured to optically interact with the collimated light from the condenser;

a first imaging lens configured to collect the light from the logo; and a second imaging lens that in conjunction with the first imaging lens is configured to produce a resulting image on a target surface, wherein the logo projector has a track length of less than 15 mm.

2. The logo projector of claim 1, wherein the first and second imaging lenses are one of PMMA and PC material.

3. The logo projector of claim 1, wherein the first and second imaging lenses both have a higher order aspheric surface.

4. The logo projector of claim 1, wherein the logo projector provides a telecentricity of 0 degrees.

5. A projection system, comprising:

the logo projector of claim 1; and the target surface, wherein the target surface is tilted at about 30 degrees relative to the logo projector and the target surface is located at a distance of about 75 mm from the logo projector.

6. A vehicle logo display system, comprising:

a logo projector, comprising:

an LED light source configured to produce light;

a condenser configured to receive the light from the LED light source and output substantially collimated light;

a logo to be projected that is configured to optically interact with the collimated light from the condenser, a first imaging lens configured to collect the light from the logo, and a second imaging lens that in conjunction with the first imaging lens is configured to produce a resulting image on a target surface, wherein the logo projector is mounted in a first vehicle location; and the target surface is located at a second vehicle location, wherein the logo projector has a track length of less than 15 mm.

7. The vehicle logo display system of claim 6, wherein the first vehicle location is an armrest.

8. The vehicle logo display system of claim 7, wherein the second vehicle location is a center console.

9. The vehicle logo display system of claim 7, wherein the logo projector is embedded within the armrest.

10. The vehicle logo display system of claim 6, wherein the target surface is tilted at 30 degrees relative to the logo projector.

11. The vehicle logo display system of claim 6, wherein the target surface is at a distance of about 75 mm from the logo projector.

12. A logo projector, consisting of:

a light source configured to produce light;

a condenser configured to receive the light from the LED light source and output substantially collimated light;

a logo to be projected that is configured to optically interact with the collimated light from the condenser; and first and second imaging lenses configured to collect the light from the logo and produce a resulting image on a target surface, the first and second imaging lenses formed of one of PMMA and PC material, wherein the logo projector has a track length of less than 15 mm.

* * * * *